(12) United States Patent
Strosaker et al.

(10) Patent No.: US 11,909,770 B2
(45) Date of Patent: *Feb. 20, 2024

(54) ONGOING AND ON-DEMAND SECURE VERIFICATION OF AUDIT COMPLIANCE

(71) Applicant: INTERNATIONAL BUSINESS MACHINES CORPORATION, Armonk, NY (US)

(72) Inventors: Michael T. Strosaker, Austin, TX (US); Sandra P. Nava, Austin, TX (US); Eric Richter, Austin, TX (US); Jon P. Weiser, Austin, TX (US); Matt Hartenbower, Austin, TX (US); George C. Wilson, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 129 days.

This patent is subject to a terminal disclaimer.

(21) Appl. No.: 17/562,421

(22) Filed: Dec. 27, 2021

(65) Prior Publication Data

US 2022/0124121 A1    Apr. 21, 2022

Related U.S. Application Data

(63) Continuation of application No. 16/246,613, filed on Jan. 14, 2019, now Pat. No. 11,265,348.

(51) Int. Cl.
*H04L 9/40* (2022.01)
*H04L 9/32* (2006.01)

(52) U.S. Cl.
CPC ............ *H04L 63/20* (2013.01); *H04L 9/3247* (2013.01)

(58) Field of Classification Search
CPC .................................................. H04L 63/0892
See application file for complete search history.

(56) References Cited

U.S. PATENT DOCUMENTS 7,181,017 B1 * 2/2007 Nagel .................. H04L 9/0841
380/282
7,627,891 B2   12/2009 Williams et al.
(Continued)

OTHER PUBLICATIONS

Xia et al. (BBDS: Blockchain-Based Data Sharing for Electronic Medical Records in Cloud Environments, MDPI, Apr. 17, 2017) (Year: 2017).*

(Continued)

*Primary Examiner* — Alexander Lagor
*Assistant Examiner* — Shu Chun Gao
(74) *Attorney, Agent, or Firm* — Teddi Maranzano (57) ABSTRACT

Providing an accurate and on-demand status of audit compliance is disclosed. A security policy, agreed upon by a service provider and a service user, is provisioned in a compliance log. A service provider requests to add a first update to the compliance log, the first update indicating that a compliance action has been taken. The first update is added to the compliance log, and a first computational digest of the compliance log is added after adding the first update. An auditor of the compliance action requests to add a second update to the compliance log. The second update is added to the compliance log, and a second computational digest of the compliance log is added after adding the second update. Thereby, the user is provided a more current view of audit compliance that that can be trusted based on the tamper-proof compliance log.

20 Claims, 5 Drawing Sheets (56) References Cited

U.S. PATENT DOCUMENTS

| | | | |
|---|---|---|---|
| 9,710,672 | B2 | 7/2017 | Braun |
| 10,893,066 | B1* | 1/2021 | Oliphant ............. H04L 63/1441 |
| 11,265,348 | B2* | 3/2022 | Strosaker .............. H04L 9/3239 |
| 2007/0136814 | A1 | 6/2007 | Lee et al. |
| 2008/0092235 | A1* | 4/2008 | Comlekoglu ......... G06F 11/326 713/176 |
| 2008/0294480 | A1 | 11/2008 | Backes et al. |
| 2010/0042846 | A1* | 2/2010 | Trotter .................. H04L 63/104 235/375 |
| 2010/0257583 | A1 | 10/2010 | Ngo et al. |
| 2011/0276490 | A1 | 11/2011 | Wang et al. |
| 2020/0126321 | A1 | 4/2020 | Swearingen |
| 2020/0228570 | A1 | 7/2020 | Strosaker et al. |
| 2020/0327230 | A1 | 10/2020 | Bitauld |

OTHER PUBLICATIONS

Cuppens et al., "Specifying a security policy: a case study", Proceedings 9th IEEE Computer Security Foundations Workshop, Mar. 1996, 12 pages, IEEE Computer Society, Washington DC, DOI: 10.1109/CSFW.1996.503697.

Halle et al., "Decentralized enforcement of document lifecycle constraints", Information Systems, vol. 74, May 2018, pp. 117-135, Elsevier B.V., Amsterdam, Netherlands.

Han et al., "A survey on policy languages in network and security management", Computer Networks, vol. 56, Issue 1, Jan. 2012, pp. 477-489, International Council for Computer Communication, Elsevier, Amsterdam, Netherlands.

Logsentinel, "LogSentinel All your logs, data and documents—protected by blockchain technology" (website), [Accessed Nov. 14, 2018], 8 pages, URL: https://logsentinel.com/.

Moyce, "How Blockchain Can Revolutionize Regulatory Compliance", Corporate Compliance Insights (online), Aug. 2016 [Accessed Nov. 14, 2018], 5 pages, URL: http://www.corporatecomplianceinsights.com/blockchain-regulatory-compliance/.

Murraya, "Tamper-proofing log files", Cryptography, StackExchange (online), Apr. 2013 [Accessed Nov. 14, 2018], 1 page, URL: https://crypto.stackexchange.com/questions/8104/tamper-proofing-log-files.

Neisse et al., "A Blockchain-based Approach for Data Accountability and Provenance Tracking", Cornell University Library e-Print Archive online (arxiv.org), Jun. 2017, 9 pages, URL: https://arxiv.org/pdf/1706.04507.

P201801984US02, Appendix P; List of IBM Patent or Applications Treated as Related, Dec. 27, 2021, 2 pages.

Sandhu et al. "Role-based access control models", IEEE Computer, vol. 29, Issue 2, Feb. 1996, pp. 38-47, IEEE Computer Society Press, Los Alamitos, CA, DOI: 10.1109/2.485845.

Sun et al., "Quantum Logics for Access Control in Cloud Computing and Blockchain", Studia Logica, Jul. 2018, p. 1-29, Springer Publishing, New York.

\* cited by examiner

Security Policy
301

Policy Event
303

Pointer 323

Digest 305

Signature 307

Audit Event
309

Compliance Indicator 315

Digest 311

Signature 313

ONGOING AND ON-DEMAND SECURE VERIFICATION OF AUDIT COMPLIANCE

CROSS-REFERENCE TO RELATED APPLICATION

This application is a continuation application of and claims priority from U.S. patent application Ser. No. 16/246,613, filed Jan. 14, 2019.

BACKGROUND

Field of the Invention

The field of the invention is data processing, or, more specifically, methods, apparatus, and products for ongoing and on-demand secure verification of audit compliance.

Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Businesses often have to provide information to show compliance with different government regulations. These regulations include, for example, the Sarbanes-Oxley (SOX) Act, the Health Insurance Portability and Accountability Act (HIPAA), and the like. Often times, compliance with these and other regulations may be shown using information contained in audit logs maintained by information technology (IT) organizations. For compliance reasons, these audit logs often are maintained for years. Audit logs are useful for checking the enforcement and effectiveness of information technology controls, accountability, and vulnerability, and/or risk analysis. An information technology organization also may use auditing of security related critical activities to aid in forensic investigations, such as security incidents that may occur. When a security incident occurs, an audit log enables an analysis of the history of activities that occurred prior to the security incident occurring. These activities include, who did what, when, where, and how. With the analysis of an audit log, appropriate corrective actions may be taken. Audit logs are typically made available in relational databases to allow easy querying of the information by reporting programs or software to generate operational and trend reports.

While compliance may be seen to ensure the ability to ensure that a security policy is enforced, compliance may also be applied to other types of policy, such as service level agreements (e.g. using timestamps on audit logs to ensure that an overall Service Level Agreement (SLA) is satisfied), legislative compliance (e.g., on control or release of privacy-related information), or even policy management itself (e.g., who changed a policy, when and how, and was it in compliance with the policy for compliance-policy-management).

Further, compliance with a particular policy, or a detailed forensics examination of actions within a system, may require more than just "audit" logs. It may also require access to error and trace logs, typically used within the scope of a problem determination examination.

When determining a system's compliance with a desired policy, typically logs (such as audit logs) are searched and used as the basis for validating that a policy is successfully implemented. While such approaches generally work well for their intended purpose, one difficulty with this approach is that a user cannot independently verify, on-demand, that a service provider is adhering to the security policy. Further, the user cannot verify that an audit has been recently performed by the auditor or performed according to schedule. Still further, the integrity of the audit log should be guaranteed to be free from tampering.

SUMMARY

An embodiment of the present disclosure is directed to a method of ongoing and on-demand secure verification of audit compliance comprising providing a security policy in a compliance log, receiving a service provider request to add a first update to the compliance log, wherein the first update indicates that a compliance action has been taken, adding the first update to the compliance log, adding a first computational digest of the compliance log after adding the first update, receiving an auditor request to add a second update to the compliance log, adding the second update to the compliance log, and adding a second computational digest of the compliance log after adding the second update.

Another embodiment of the present disclosure is directed to an apparatus for ongoing and on-demand secure verification of audit compliance, the apparatus comprising a computer processor, a computer memory operatively coupled to the computer processor, the computer memory having disposed within it computer program instructions that, when executed by the computer processor, cause the apparatus to carry out the steps of providing a security policy in a compliance log, receiving a service provider request to add a first update to the compliance log, wherein the first update indicates that a compliance action has been taken, adding the first update to the compliance log, adding a first computational digest of the compliance log after adding the first update, receiving an auditor request to add a second update to the compliance log, adding the second update to the compliance log, and adding a second computational digest of the compliance log after adding the second update.

Still another embodiment of the present disclosure is directed to a computer program product for ongoing and on-demand secure verification of audit compliance, the computer program product disposed upon a computer readable medium, the computer program product comprising computer program instructions that, when executed, cause a computer to carry out the steps of providing a security policy in a compliance log, receiving a service provider request to add a first update to the compliance log, wherein the first update indicates that a compliance action has been taken, adding the first update to the compliance log, adding a first computational digest of the compliance log after adding the first update, receiving an auditor request to add a second update to the compliance log, adding the second update to the compliance log, and adding a second computational digest of the compliance log after adding the second update.

In various embodiments, providing a security policy in a compliance log further includes providing, to the service provider and the auditor, read/write access to the compliance log, and providing, to a user, read-only access to the compliance log. Adding a first computational digest of the compliance log after adding the first update may further include adding a digital signature of the service provider, and adding a second computational digest of the compliance log after adding the second update may further include adding a digital signature of the auditor. A plurality of copies of the compliance log may be each maintained and updated independently. The first update may include pointer data for accessing, by the auditor, service provider records that verify the first update, and the pointer data may be hidden from the user. The second update may include a compliance indicator. The compliance log may be implemented using blockchain.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
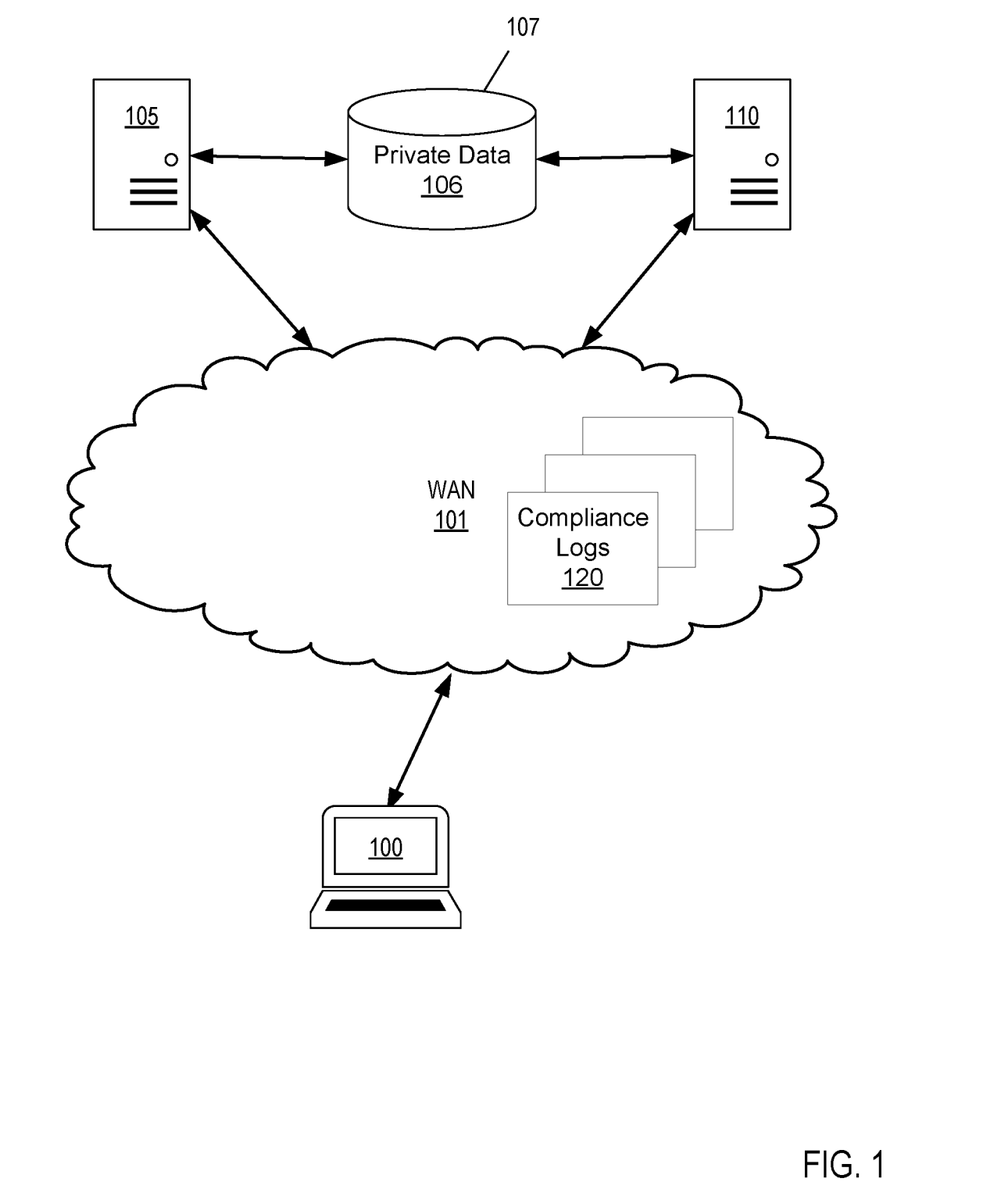
FIG. 1 sets forth a network diagram of a system configured for ongoing and on-demand secure verification of audit compliance according to embodiments of the present invention.

Exemplary methods, apparatus, and products for ongoing and on-demand secure verification of audit compliance in accordance with the present invention are described with reference to the accompanying drawings, beginning with FIG. 1. A service provider offers data services to one or more users in accordance with security requirements agreed upon by the service provider and the user. For example, the data services may be cloud computing services, and the security requirements may be a security policy that governs those services. An auditor entity is responsible for ensuring that the service provider adheres to the security policy. FIG. 1 sets forth a network diagram of a system configured for ongoing and on-demand secure verification of audit compliance according to embodiments of the present invention.

The system of FIG. 1 includes server (105) through which the service provider offers data services to a user computer (100) in accordance the security requirements. The user computer (100) receives those data services provided by the service provider server (105) through a wide area network (WAN) (101). The data services may be offered through any number of servers (105) that are maintained by the service provider. When the service provider performs an action in compliance with the security policy, the server (105) publishes that policy event to a compliance log (120). The auditor entity examines the compliance log (120) to verify compliance with the security policy, and an audit server (110) maintained by the auditor entity publishes audit events to the compliance log (120) indicating such compliance or non-compliance. The auditor entity may access private data (106) in a database (107) of the service provider entity to verify the updates published to the compliance log.

The service provider entity, auditor entity, and user define a group for security policy compliance. Multiple exact copies of the compliance log (120) are maintained within the WAN (101) at various locations, which may include residence on group member computers, and are available to the group members. Policy events and audit events are committed to all copies of the log (120) when all group members agree to the update as based upon predetermined protocols. Consensus copies of the compliance log may be maintained on the service provider server (105), the audit server (110), and/or other third-party systems in the WAN (101).

The arrangement of servers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Ongoing and on-demand secure verification of audit compliance in accordance with the present invention is generally implemented with computers, that is, with automated computing machinery. In the system of FIG. 1, for example, all the service provider server (105), audit server (110), user computer (100), and compliance log (120) are implemented to some extent at least as computers. For further explanation, therefore, FIG. 2 sets forth a block diagram of automated computing machinery comprising an exemplary computer (152) configured for ongoing and on-demand secure verification of audit compliance according to embodiments of the present invention. The computer (152) of FIG. 2 includes at least one computer processor (156) or 'CPU' as well as random access memory (168) ('RAM') which is connected through a high speed memory bus (166) and bus adapter (158) to processor (156) and to other components of the computer (152).

Figure 2:
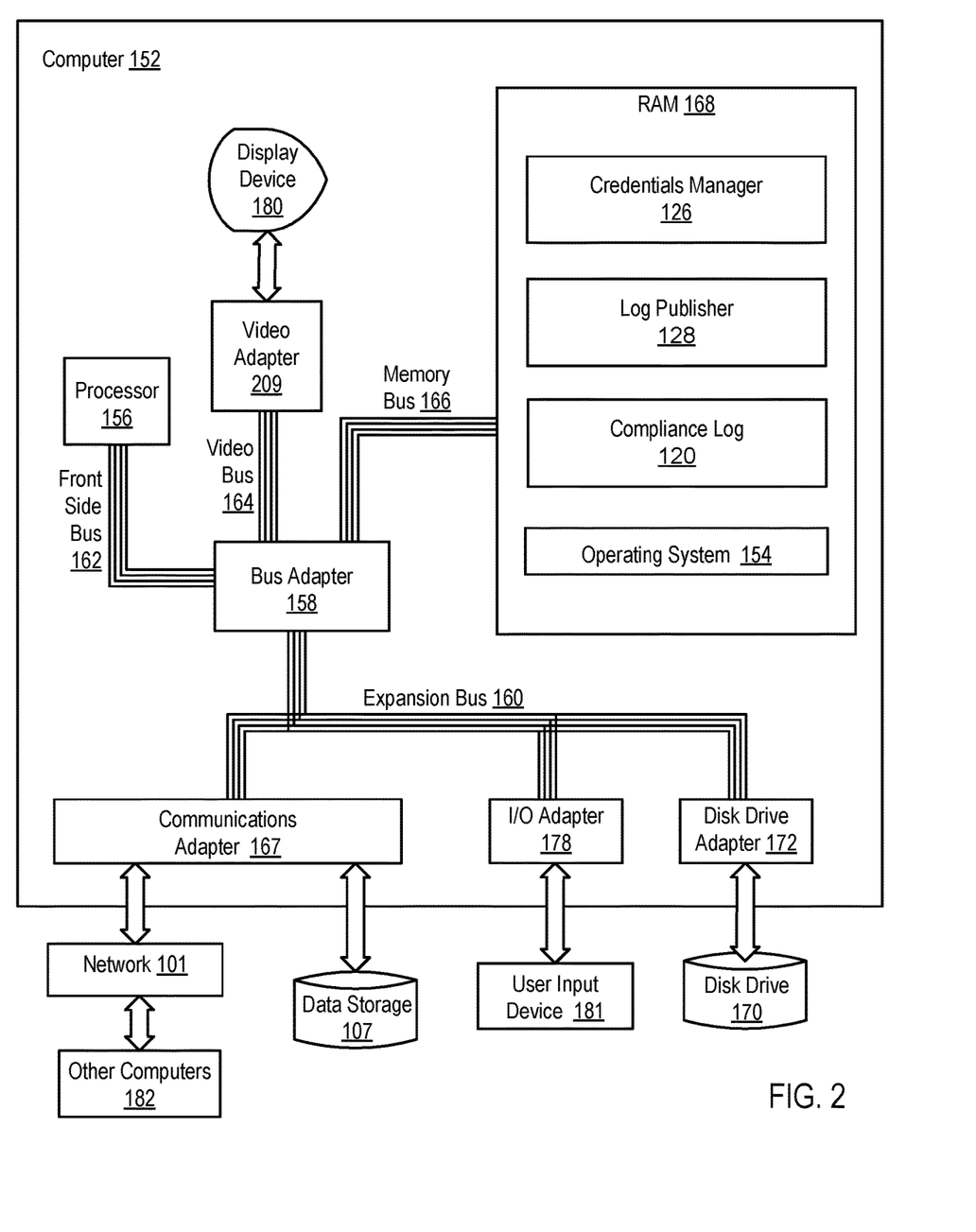
FIG. 2 sets forth a block diagram of a computer configured for ongoing and on-demand secure verification of audit compliance according to embodiments of the present invention.

Stored in RAM (168) is a credentials manager (126), a module of computer program instructions for determining access and permissions with regard to a compliance log (120). Also stored RAM (168) is a log publisher (128), a module of computer program instructions improved for ongoing and on-demand secure verification of audit compliance according to embodiments of the present invention. The log publisher (128) receives requests from a service prover server (105) to commit a policy event to the compliance log (120) or to publish a new policy, receives requests from the audit server (110) to commit audit events to the compliance log (120), and receives requests from users computer (100) to view the compliance log (120).

Also stored in RAM (168) is an operating system (154). Operating systems useful in computers configured for ongoing and on-demand secure verification of audit compliance according to embodiments of the present invention include UNIX™, Linux™, Microsoft XP™, AIX™, IBM's i5/OS™, and others as will occur to those of skill in the art. The operating system (154), credentials manager module (126), and log publisher module (128) in the example of FIG. 2 are shown in RAM (168), but many components of such software typically are stored in non-volatile memory also, such as, for example, on a disk drive (170). The compliance log (120) may be stored in non-volatile memory.

The computer (152) of FIG. 2 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers configured for ongoing and on-demand secure verification of audit compliance according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 2 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 2 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computer (152) of FIG. 2 includes a communications adapter (167) for data communications with other computers (182) and for data communications with a data communications network (101). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for ongoing and on-demand secure verification of audit compliance according to embodiments of the present invention include modems for wired dial-up communications, Ethernet (IEEE 802.3) adapters for wired data communications, and 802.11 adapters for wireless data communications.

A compliance log (120) can achieve safety against tampering by maintaining a network of exact copies, and only adding new entries if the network agrees. The network in this case consists of three types of actors: service providers, auditors, and users. For example, a service providers may be a company that provide some kind of platform for which they publish and adhere to a security policy. The service provider is the primary publisher of events to the compliance log (120). Events are any form of update regarding the security policy, such as publishing a new version of the policy document, to smaller updates such as the opening or closing of bugs. Each event contains a reference to the corresponding set of relevant data, which is stored in a database controlled by the service provider. In the case of a security policy document, the reference data refer to where the document can be read. As another example, bugs may refer to an internal tracking number. Users may only have selective access to specific bug details. Thus, critical security flaws can be acknowledged, but not necessarily made public until a patch is provided.

Auditors on the network provide a more specialized role: they may gain access to a service provider's private data (106), and they publish audit events that either confirm or reject a service provider's claim that they are adhering to their security policy. The role of the auditor is to ensure that the service provider's entries in the compliance log (120) are accurate on a regular basis. For example, auditors add new entries to the compliance log (120) indicating the result of the audit upon expiration of a security policy, and the service provider would then log a new policy with an updated expiration date. Auditor entries may include results such as a compliance indicator of whether the service provider has or has not adhered to the security policy.

Users are consumers of the service provider's services and parties to the security policy, but are passive actors on the network. They may receive events from the network, but cannot add or alter events. Users have full access to the history of the compliance log (120), and thus can verify for themselves whether a service provider is adhering to their current security policy, but certain details of the events may be known only to the auditor and service provider. Since security policy documents are machine-parsable, this can be automated by replaying the event log starting at the most recent policy update. For example, if the policy defines that bugs should be closed within two weeks, the time difference between bug-open and bug-close events must be less than two weeks.

Figure 3:
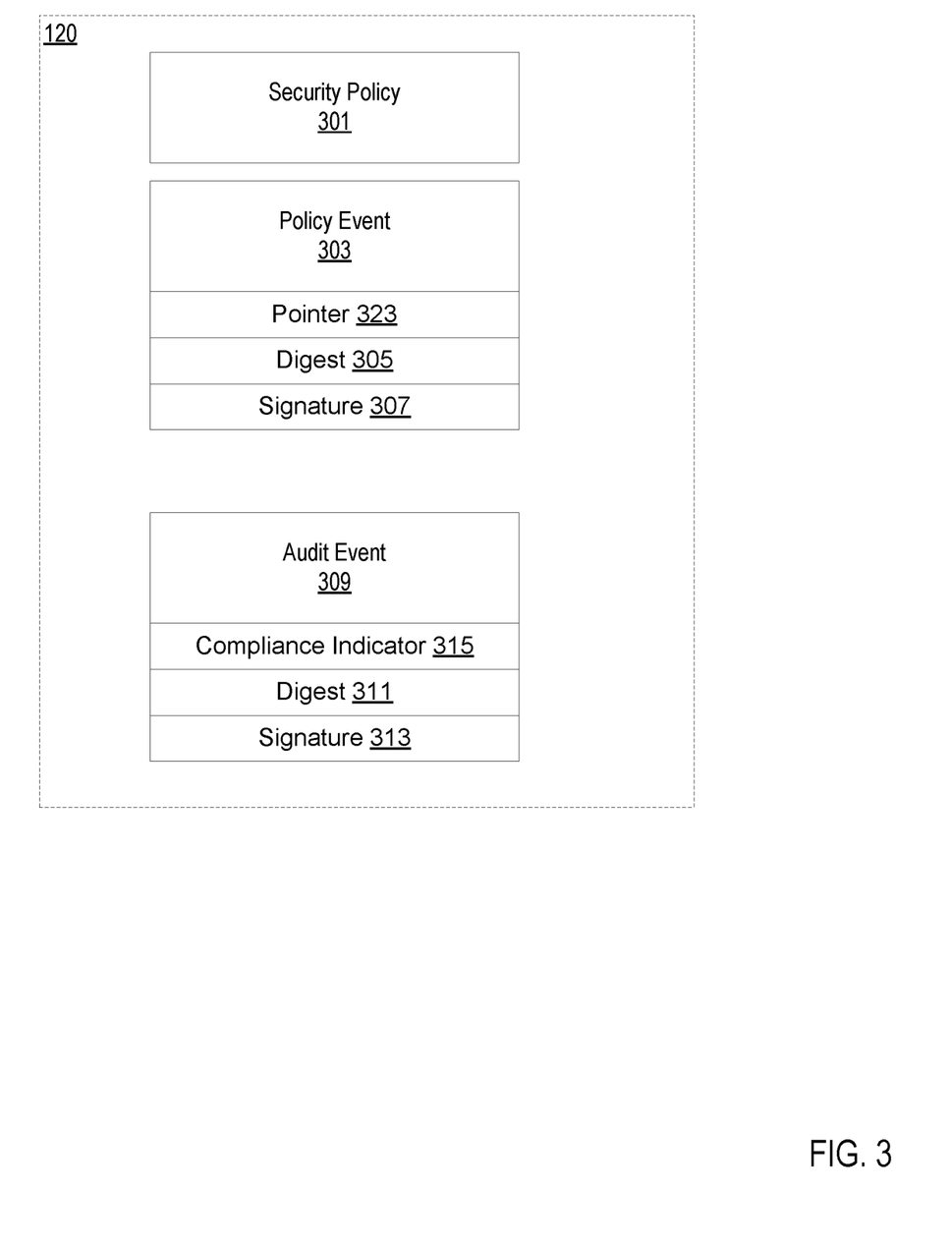
FIG. 3 sets forth a block diagram of an exemplary compliance according embodiments of the present invention.

For further explanation, FIG. 3 sets forth a diagram illustrating an exemplary compliance log (120) for ongoing and on-demand secure verification of audit compliance according to embodiments of the present invention. An example compliance log may include a machine-parsable security policy (301), at least one policy event (303) committed by the service provider entity, a digest (305) of the entire compliance log after the policy event (303) signed with a digital signature (307) of the service provider entity, an audit event (309) indicating that the auditor entity has verified the policy event, a digest (311) of the entire compliance log after the audit event (309) signed with a digital signature (313) of the auditor entity, and a compliance indicator (315).

In the example of FIG. 3, the security policy (301) is implemented in a machine-readable and machine-parsable language. Policies can be expressed a language derived from XML intended to articulate complex privacy policies, such as XACML, WSDL, XML DTD, and XML Schema. Alternatively, policies can be expressed in other machine-parsable formats that may be adapted for articulating security requirements. The security policy (301) is agreed upon with an auditor.

and is published in the compliance log (120) by the service provider, auditor, or both. A security policy may include a number of requirements to which the service provider must adhere. By way of example and not limitation, such requirements may include: the amount of time a defect may be opened before it must be resolved; how often regular health checks and antivirus scans must be run; how passwords must be structured; how long a security patch for certain products may be available before they must be applied; and an expiration date for the policy. Once the security policy (301) is defined, the policy (301) is added to the compliance log (120) maintained and agreed upon by the service provider entity, auditor entity, other third-party hosts, and any customers that desire.

When a service provider entity performs an action in compliance with the security policy (301), it publishes a policy event (303) to the compliance log (120). The policy event (303) states that a particular action has been taken in adherence to the security policy. For example, a policy event (303) could state that a regular antivirus check has been performed on the service provider's system, or that a particular patch has been applied to resolve a security risk. The policy event (303) includes further details that can be verified by the auditor entity. For example, the policy event (303) includes a pointer (323) to a set of private data (106) in the service provider's system through which the auditor entity may view and verify that the corresponding policy event (303) has indeed taken place. For example, the pointer (323) may be a path to an internal private directory that shows that antivirus software has been run, or that a particular patch has been applied. The service provider entity may use normal access control mechanisms to ensure that only the parts of the record they want to be public can be seen. The user computer (100) can verify at any time that the service provider is compliant to the agreed policy, and the auditor entity will be able to validate that the terms were satisfied upon expiration of the policy.

In an embodiment according to the present disclosure, the portion of the policy event (303) containing the pointer (323) is encrypted by the service provider entity and may be decrypted by the auditor entity. By encrypting or otherwise hiding the pointer (323) from the user or any other party outside the group, the security flaws that have been fixed or are awaiting repair will not be exposed.

In an embodiment according to the present disclosure, the compliance log (120) is implemented using blockchain technology. As each policy or audit event occurs, and the group members agree to its details, the event is encoded into a block of digital data and uniquely signed or identified. Each block is connected to the one before and after it, creating an irreversible, immutable chain. Blocks are chained together, preventing any block from being altered or a block being inserted between two existing blocks.

To ensure the integrity of the compliance log (120), a digest (305) of the contents of the compliance log (120) is computed after the addition of the policy event (303). The digest (305) may be a hash of the contents of the compliance log (120). The digest (305) provides an immutable indicator of the contents of the compliance log (120) up to that point. Accordingly, any attempt to add, delete, or change the contents of the compliance log (120) would be detectable by "replaying" the compliance log (120) with the digest or hash computation. In this respect, at least, the compliance log (120) is tamper-proof and verifiable. In an embodiment according to the present disclosure, the digest (305) may be digitally signed by the service provider entity.

After one or more policy events (303) have been published, or at the expiration of the security policy (301), the auditor entity will perform an audit of the security policy (301) as well as any policy events (303) that have been published. For each policy event (303), the auditor entity uses the pointer data (323) to access the server provider entity's set of private data (106) to determine that the service provider is in compliance with the security policy (301) and/or that all policy events (303) in the compliance log (120) have indeed occurred. After independent verification, the auditor entity publishes an audit event (309) to the compliance log (120). The audit event (309) may further include an indicator (315) that indicates to service provider and the user whether the service provider entity is in compliance with the security policy (301).

To further ensure the integrity of the compliance log (120), a digest (311) of the contents of the compliance log (120) is computed after the addition of the audit event (309). The digest (311) may be a hash of the contents of the compliance log (120). The digest (311) provides an immutable indicator of the contents of the compliance log (120) up to that point. Accordingly, any attempt to add, delete, or change the contents of the compliance log (120) would be detectable by "replaying" the compliance log (120) with the digest or hash computation. In this respect, at least, the compliance log (120) is tamper-proof and verifiable. In an embodiment according to the present disclosure, the digest (311) may be digitally signed (313) by the auditor entity.

The user computer (100) may view the compliance log (120) at any time to determine a level of compliance. A view of the compliance log (120) available to the user computer (100) will show that policy events (303) have occurred and that audit events (309) have verified the actions. In this manner, a verifiable audit trail is made available to the auditor, while a redacted view of the audit trail is made available to the user computer (100) and other parties, so that security weak-points will not be exposed.

At least the service provider and the auditor can maintain and write to copies of the compliance log (120). The credentials manager (126) on a node that maintains a copy of the compliance log (120) determines who is able to read and/or publish updates to the compliance log (120). The log publisher module (128) performs actions, based on credentials, for committing and publishing updates to the compliance log (120).

Figure 4:
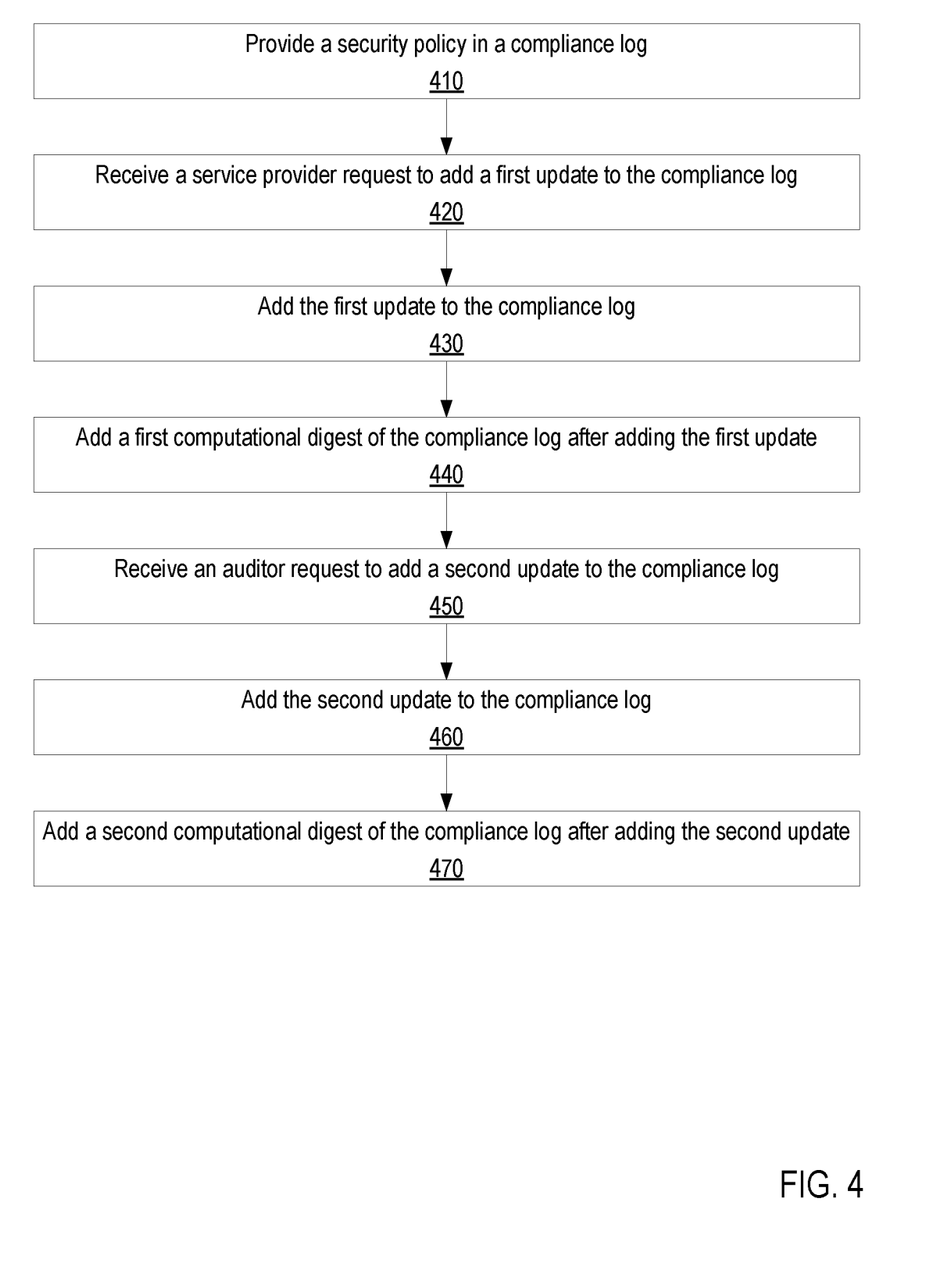
FIG. 4 sets forth a flow chart illustrating a method according to embodiments of the present invention.

For further explanation, FIG. 4 sets forth a flow chart illustrating a further exemplary method for ongoing and on-demand secure verification of audit compliance according to embodiments of the present invention that includes providing a security policy in a compliance log (410), receiving a service provider request to add a first update to the compliance log, wherein the first update indicates that a compliance action has been taken (420), adding the first update to the compliance log (430), adding a first computational digest of the compliance log after adding the first update (440), receiving an auditor request to add a second update to the compliance log, wherein the second update includes a compliance indicator (450), adding the second update to the compliance log (460), and adding a second computational digest of the compliance log after adding the second update (470).

Any node that maintains a copy of the compliance log (120) provides (410) the security policy (301) in the compliance log (120).

The node may receive (420) a service provider request to add a first update, which may be a policy event (303) to the compliance log (120). For example, when a service provider entity performs an action in compliance with the security policy (301), it publishes a policy event (303) to the compliance log (120). The policy event (303) states that a particular action has been taken in adherence to the security policy. The policy event (303) includes further details that can be verified by the auditor entity. When the network nodes maintaining the copies of the compliance log (120)

agree that that policy event (303) should be added, the compliance log is updated (430) with the service provider request.

A digest of the compliance log is computed (440) and added to the compliance log (120) after an update is added. For example, a digest (305) of the contents of the compliance log (120) is computed after the addition of the policy event (303) and includes the entire contents of the compliance log (120) up to that point. The digest (305) may be a hash of the contents of the compliance log (120).

The node may later receive (450) an auditor request to update the compliance log (120) with an audit event (309). After one or more policy events (303) have been published, or at the expiration of the security policy (301), the auditor entity will perform an audit of the security policy (301) as well as any policy events (303) that have been published. After independent verification, the auditor entity publishes an audit event (309) to the compliance log (120). The audit event (309) may further include an indicator (315) that indicates to service provider and the user whether the service provider entity is in compliance with the security policy (301). When the network nodes maintaining the copies of the compliance log (120) agree that that policy event (303) should be added, the compliance log is updated (460) with the service provider request.

A digest of the compliance log is computed (470) and added to the compliance log (120) after the auditor update is added. For example, a digest (311) of the contents of the compliance log (120) is computed after the addition of the audit event (309) and includes the entire contents of the compliance log (120) up to that point. The digest (311) may be a hash of the contents of the compliance log (120).

Figure 5:
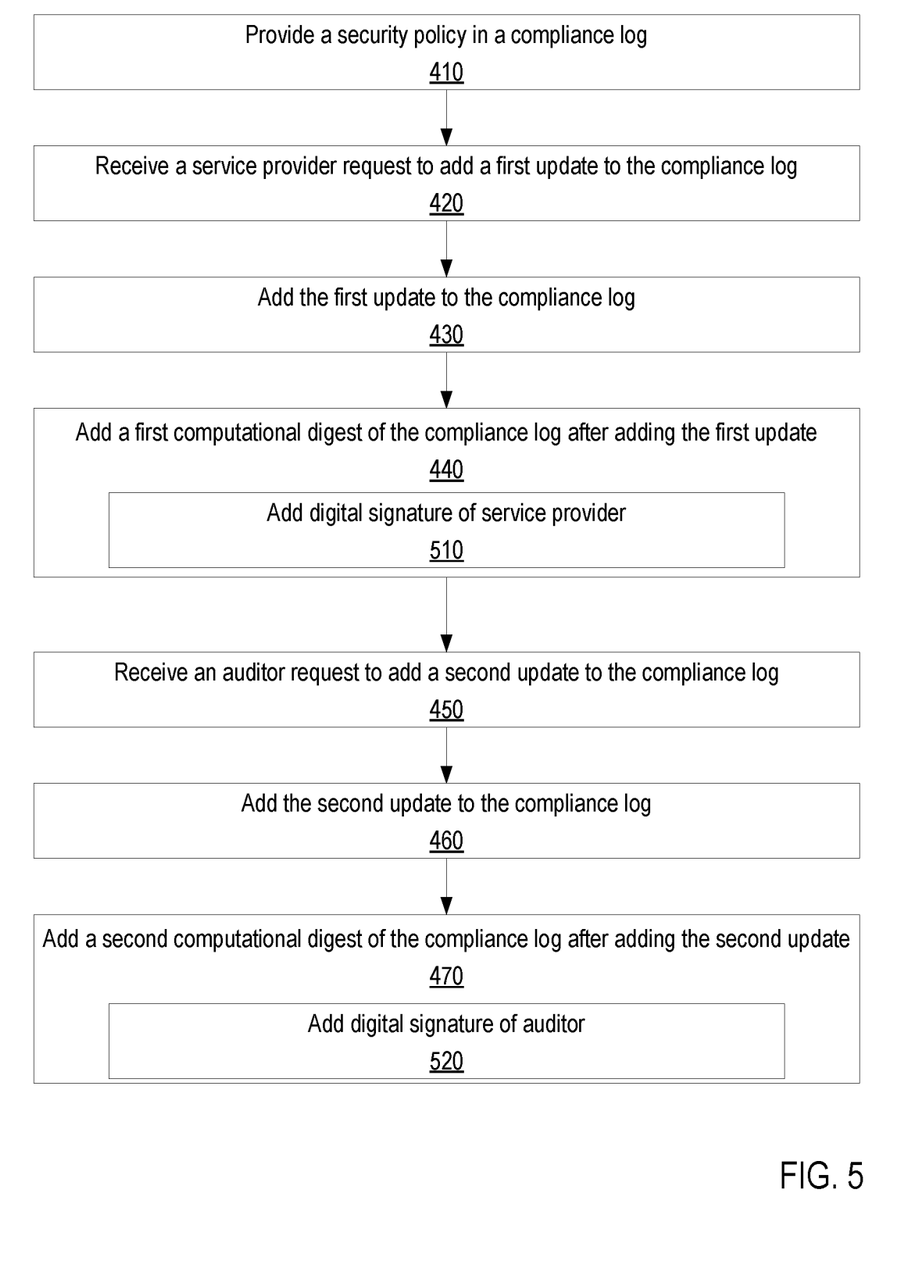
FIG. 5 sets forth a flow chart illustrating a method according to embodiments of the present invention.

For further explanation, FIG. 5 sets forth a flow chart illustrating a further exemplary method for ongoing and on-demand secure verification of audit compliance according to embodiments of the present invention. The exemplary method illustrated in FIG. 5 is similar to the method of FIG. 4 in that it includes providing a security policy in a compliance log (410), receiving a service provider request to add a first update to the compliance log, wherein the first update indicates that a compliance action has been taken (420), adding the first update to the compliance log (430), adding a first computational digest of the compliance log after adding the first update (440), receiving an auditor request to add a second update to the compliance log, wherein the second update includes a compliance indicator (450), adding the second update to the compliance log (460), and adding a second computational digest of the compliance log after adding the second update (470).

In the example of FIG. 5, adding a first computational digest of the compliance log after adding the first update (440) further includes adding a digital signature of the service provider (510). Adding a second computational digest of the compliance log after adding the second update (470) further includes adding a digital signature of the auditor (520). Thus, the digest (305) may be digitally signed by the service provider entity and the digest (311) may be digitally signed (313) by the auditor entity, and added to the compliance log (120).

In view of the explanations set forth above, readers will recognize that the benefits of ongoing and on-demand secure verification of audit compliance according to embodiments of the present invention includes multi-party consensus concerning the integrity of records relevant to security. policy compliance, in which part of the records are kept private from some parties. This consensus ensures system resistance to revision, corruption, or tampering. The system provides an automated means of retrieving an instant snapshot of current compliance to agreed-upon security policies.

The benefits of ongoing and on-demand secure verification of audit compliance according to embodiments of the present invention further includes verifiable proof that a particular service defines and adheres to a security policy without revealing more information than is necessary. A consensus of a log of various records by multiple parties provides the ability to prove that records have not been altered or inserted. By defining data points useful to a security audit as records, verifiable proof based on both objective and subjective measures can be retrieved from any time range, without a possibility of the history being doctored. The inability to modify history forces system administration to be honest and simplifies the audit process.

Exemplary embodiments of the present invention are described largely in the context of a fully functional computer system for ongoing and on-demand secure verification of audit compliance. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of providing ongoing and on-demand secure verification of audit compliance for a security policy in a computer network, the method comprising:
    identifying a first update published by a service provider in a compliance log, the first update including: an indication that a compliance action has been taken, a pointer to private data of the service provider, a first digest of the compliance log, and a digital signature of the service provider;
    verifying, by an auditor, performance of the compliance action using the pointer to the private data of the service provider; and
    publishing, by the auditor, a second update to the compliance log, the second update including: an indication that the service provider is in compliance with a security policy, a second digest of the compliance log, and a digital signature of the auditor.

2. The method of claim 1 wherein
    the auditor and the service provider are provided with read/write access to the compliance log, and
    wherein a user is provided with read-only access to the compliance log.

3. The method of claim 1 wherein the first digest of the compliance log is a hash of the compliance log, and wherein the second digest of the compliance log is a hash of the compliance log.

4. The method of claim 1 wherein a plurality of copies of the compliance log are each maintained and updated independently.

5. The method of claim 1 wherein the the pointer is encrypted, and wherein the auditor decrypts the pointer.

6. The method of claim 1 wherein the compliance log includes the security policy.

7. The method of claim 1 wherein the compliance log is implemented using blockchain.

8. An apparatus for providing ongoing and on-demand secure verification of audit compliance for a security policy in a computer network, the apparatus comprising a computer processor, a computer memory operatively coupled to the computer processor, the computer memory having disposed within it computer program instructions that, when executed by the computer processor, cause the apparatus to carry out the steps of:
   identifying a first update published by a service provider in a compliance log, the first update including: an indication that a compliance action has been taken, a pointer to private data of the service provider, a first digest of the compliance log, and a digital signature of the service provider;
   verifying, by an auditor, performance of the compliance action using the pointer to the private data of the service provider; and
   publishing, by the auditor, a second update to the compliance log, the second update including: an indication that the service provider is in compliance with a security policy, a second digest of the compliance log, and a digital signature of the auditor.

9. The apparatus of claim 8 wherein
   the auditor and the service provider are provided with read/write access to the compliance log, and
   wherein a user is provided with read-only access to the compliance log.

10. The apparatus of claim 8 wherein the first digest of the compliance log is a hash of the compliance log, and wherein the second digest of the compliance log is a hash of the compliance log.

11. The apparatus of claim 8 wherein a plurality of copies of the compliance log are each maintained and updated independently.

12. The apparatus of claim 8 wherein the the pointer is encrypted, and wherein the auditor decrypts the pointer.

13. The apparatus of claim 8 wherein the compliance log includes the security policy.

14. The apparatus of claim 8 wherein the compliance log is implemented using blockchain.

15. A computer program product for providing ongoing and on-demand secure verification of audit compliance for a security policy in a computer network, the computer program product disposed upon a computer readable medium, the computer program product comprising computer program instructions that, when executed, cause a computer to carry out the steps of:
   identifying a first update published by a service provider in a compliance log, the first update including: an indication that a compliance action has been taken, a pointer to private data of the service provider, a first digest of the compliance log, and a digital signature of the service provider;
   verifying, by an auditor, performance of the compliance action using the pointer to the private data of the service provider; and
   publishing, by the auditor, a second update to the compliance log, the second update including: an indication that the service provider is in compliance with a security policy, a second digest of the compliance log, and a digital signature of the auditor.

16. The computer program product of claim 15 wherein
   the auditor and the service provider are provided with read/write access to the compliance log, and
   wherein a user is provided with read-only access to the compliance log.

17. The computer program product of claim 15 wherein the first digest of the compliance log is a hash of the compliance log, and wherein the second digest of the compliance log is a hash of the compliance log.

18. The computer program product of claim 15 wherein a plurality of copies of the compliance log are each maintained and updated independently.

19. The computer program product of claim 15 wherein the the pointer is encrypted, and wherein the auditor decrypts the pointer.

20. The computer program product of claim 15 wherein the compliance log includes the security policy.

* * * * *